Nov. 3, 1964 H. K. ROBIN ETAL 3,155,773

SYSTEM FOR SYNCHRONOUSLY DETECTING SIGNALS IN THE PRESENCE OF NOISE

Filed March 2, 1961 3 Sheets-Sheet 1

Harold Kilner Robin
Thomas Lloyd Murray
Inventors

By
Cushman, Darby & Cushman
Attorneys

SYSTEM FOR SYNCHRONOUSLY DETECTING SIGNALS IN THE PRESENCE OF NOISE

Filed March 2, 1961 3 Sheets-Sheet 2

Harold Kilner Robin
Thomas Lloyd Murray
Inventors
By Cushman, Darby & Cushman
Attorneys Nov. 3, 1964 H. K. ROBIN ETAL 3,155,773

SYSTEM FOR SYNCHRONOUSLY DETECTING SIGNALS IN THE PRESENCE OF NOISE

Filed March 2, 1961 3 Sheets-Sheet 3

Harold Kilner Robin
Thomas Lloyd Murray
*Inventors*

By
Cushman, Darby & Cushman
*Attorneys*

United States Patent Office 3,155,773
Patented Nov. 3, 1964

3,155,773
SYSTEM FOR SYNCHRONOUSLY DETECTING SIGNALS IN THE PRESENCE OF NOISE

Harold Kilner Robin, Tunbridge Wells, and Thomas Lloyd Murray, Crowborough, England, assignors to National Research Development Corporation, London, England Filed Mar. 2, 1961, Ser. No. 92,811
Claims priority, application Great Britain Mar. 9, 1960
10 Claims. (Cl. 178—69.5)

The present invention relates to synchronous communications systems. In communication systems employing time-division-multiplex transmission of a number of information channels and indeed in single channel systems employing teleprinter and like codes, it is necessary to synchronise a receiver to the transmitter. When a radio link is involved in the transmission from the transmitter to the receiver, a great deal of random noise may be superimposed on the information transmitted and under these conditions synchronisation becomes difficult.

It is an object of the present invention to provide a synchronous communications system which is capable of being operated under extremely noisy transmission conditions.

It is a further object of the present invention to provide a receiver synchronising system which will operate under extremely noisy transmission conditions.

According to the present invention, there is provided a synchronous communications system in which synchronism between a transmitter and a receiver is achieved by the transmission and reception of a signal train including a synchronising signal consisting of a whole number of cycles of a synchronising tone inserted into the signal train at regular intervals corresponding to an even whole number ($2n$) of cycles of the synchronising tone.

According to a feature of the present invention, there is provided a receiver synchronising system for a receiver arranged to receive a signal train having a predetermined whole number of cycles of a synchronising tone inserted therein at regular intervals corresponding to an even whole number ($2n$) of cycles of the synchronising tone and including a coherent oscillator arranged to be synchronised to the synchronising tone, phase reverser means for reversing the phase of signals derived from the coherent oscillator once every $n$ cycles of oscillation of the coherent oscillator, a coherent detector for detecting the relative phases of the received synchronising tone and the output of the phase reverser and means for controlling the timing of the receiver circuits in response to the output of the coherent detector.

Figure 1:
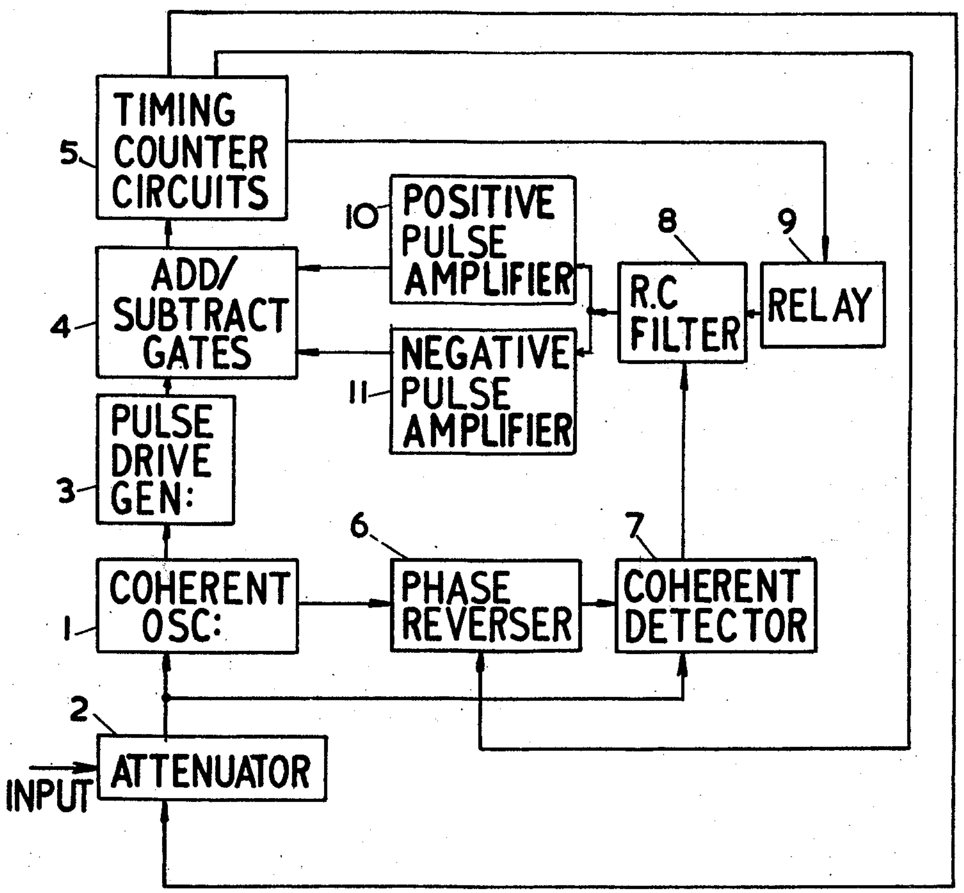
Figure 2:
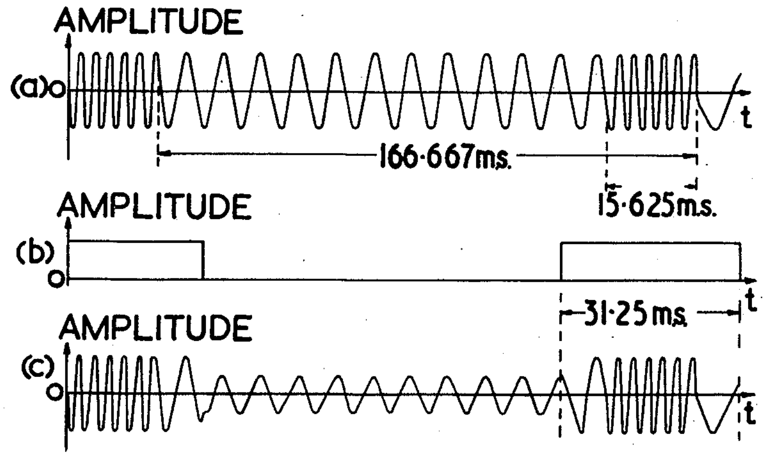
Figure 3:
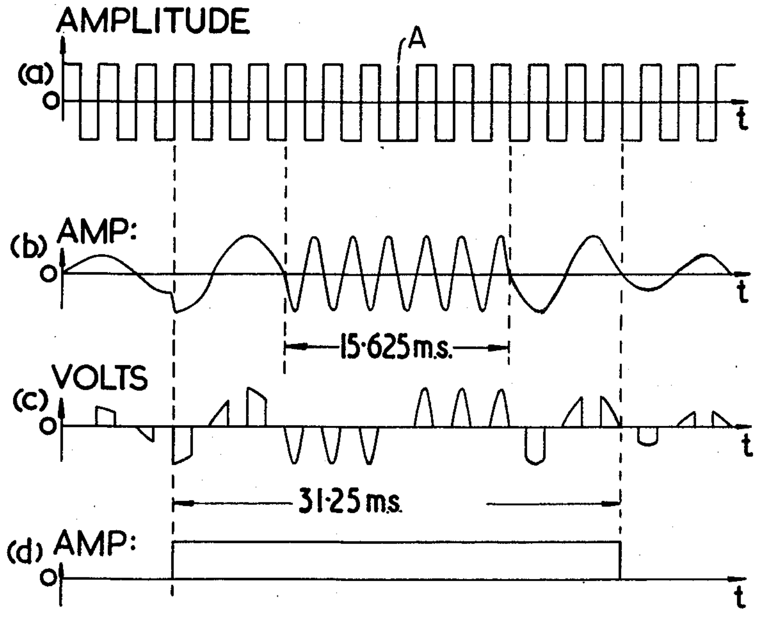
Figure 4:
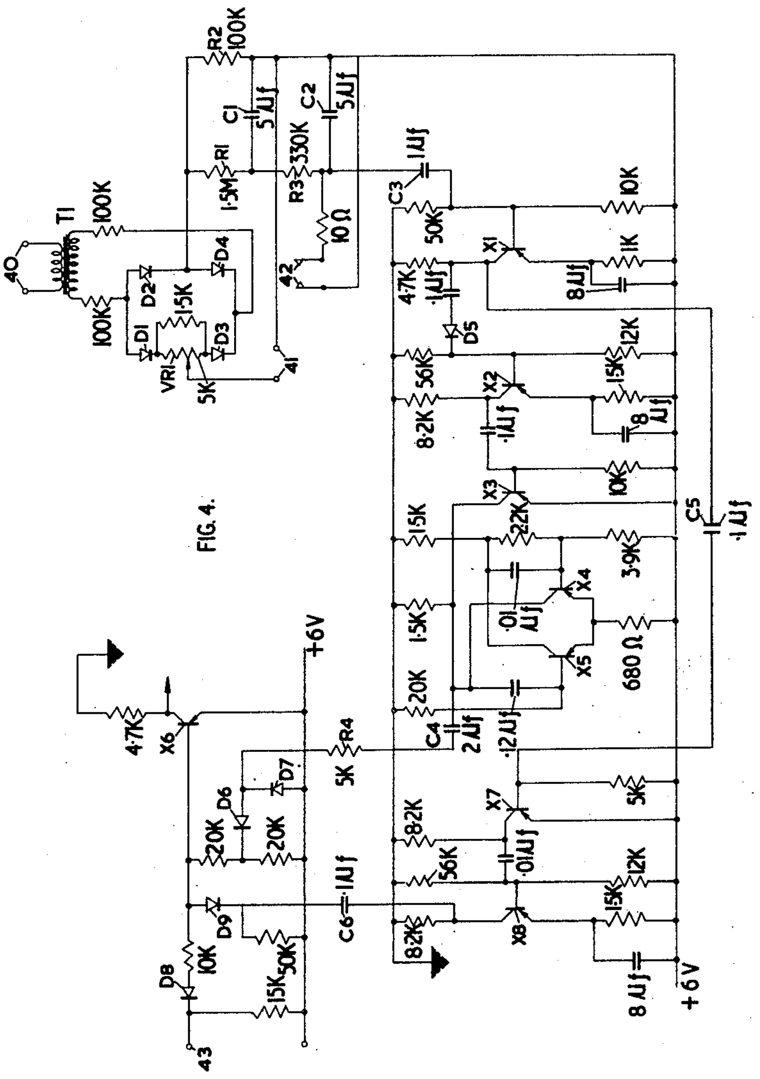

An embodiment of a receiver synchronising system will now be described with reference to the accompanying drawings, in which:

FIGURE 1 is a block schematic diagram of a receiver synchronising system for a single-channel teleprinter communications system, FIGURE 2 is a series of graphical waveforms illustrating the mode of operation of the system shown in FIGURE 1, FIGURE 3 is a further series of graphical waveforms illustrating the mode of operation of the system shown in FIGURE 1, and FIGURE 4 is a circuit diagram of part of the system shown in FIGURE 1.

FIGURE 1 shows a coherent oscillator 1 to which the received signal received by a receiver, of which the synchronising system forms part, is applied through a variable attenuator 2. This received signal comprises various discrete tones representing the various characters used in a teleprinter transmission system. The tones vary from time to time as each character is transmitted and in between each tone representing a single character there is transmitted a synchronising tone. Each tone is transmitted by a transmitter for a whole number of cycles to reduce transient effects. In the communications system of which the synchronising system to be described forms part, a character represented by a tone is transmitted by a transmitter once every sixth of a second. A period of 15.625 milliseconds within (that is to say approximately 9.4% of) the sixth of a second allotted to each character is taken up by six complete cycles of a synchronising signal of 384 cycles per second, the rest of the time being taken up by the character tone itself. The synchronising signals begin and end as the signal sine wave passes through zero in order to minimise transient effects.

The coherent oscillator 1 may comprise a tuning fork oscillator oscillating at 384 cycles per second having an inductive coupling to which the received signal is applied. The oscillator 1 has a narrow band width and its output is a substantially pure tone. The phase difference between the output of the coherent oscillator 1 and the received synchronising signal is dependent on any slight difference between the natural frequency of the oscillator and the synchronising signal frequency and can vary by $\pm\pi/2$ radians which are the limits of phase difference for which locking is possible. The output of the coherent oscillator 1 is a square waveform produced by amplifying and limiting the oscillations.

The output of the coherent oscillator 1 is applied to a pulse drive circuit 3 which produces pulses at a pulse recurrence frequency of 384 pulses per second. The output of the pulse drive circuit 3 is applied to a gate circuit 4 which normally passes the pulses to timing counter circuits 5. These timing counter circuits comprise binary and other divider circuits and diode matrices of known form to provide various control waveforms for the remainder of the receiver system. The output waveform from the coherent oscillator 1 is also applied to a phase reverser 6 to which an output from the timing counter circuits 5 are also applied to reverse the phase of the square-wave oscillations once every 32 pulses received by the timing counter circuits 5. This means that when the system is in synchronism with the received signal, the phase of the output from the phase reverser 6 will be reversed once every twelfth of a second (that is to say, once every 83.3 milliseconds).

The output of the phase reverser 6 is applied to a coherent phase detector 7 to which the received signal is also applied through the variable attenuator 2. Preferably, the amplitude of the output of the phase reverser 6 should be at least six times the amplitude of the received signal. The attenuator 2 has a switching waveform from the timing counter circuits 5 applied to it. The attenuator 2 incorporates a gate (not shown) operated by the switching waveform to allow the received signal to flow to the oscillator 1 and the coherent detector 7 unattenuated for a period of approximately 31.25 milliseconds, that is to say one thirty-second of a second, centred about one of the two times of phase reversal, during each period of 166.6 milliseconds of the square-wave oscillations in the phase reverser 6. For the remainder of 166.6 millisecond period the received signal is attenuated in the attenuator 2.

The output of the coherent phase detector 7 is passed to a resistance-capacity filter 8 which in effect integrates the output from the detector 6 as a charge on a capacitor. This capacitor is discharged by a relay 9 which is operated once a second by a signal from the timing counter circuits 5. When the capacitor in the filter 8 is discharged a pulse is emitted the sign of which depends upon the sense in which the capacitor was charged. If the pulse is positive-going, it is amplified in a positive pulse amplifier 10, the output of which is applied to the add/subtract gate 4 to cause an extra pulse (interposed between the pulses from the drive pulse generator 3) to be applied to the timing counter circuits 5. If, on the other hand, the pulse is negative-going, it is amplified in a negative pulse amplifier 11, the output of which is applied to the add/subtract gate 4 to prevent one pulse from the drive pulse generator 3 from being applied to the timing counter circuits 5. If, however, no pulse is emitted from the filter 8, the pulse train from the drive pulse generator 3 is applied to the timing counter circuits 5 unchanged.

The operation of the synchronizing system shown in FIGURE 1 will now be described with reference to FIGURES 2 and 3 which are both sets of graphical waveforms illustrating the condition of various parts of the system when it is in synchronism with the received signal.

FIGURE 2(*a*) illustrates the form of the received signal and shows the six complete cycles of the synchronization tone occurring for 15.625 milliseconds during a character period of 166.6 milliseconds, the rest of the character period being occupied by a tone representing a character. FIGURE 2(*b*) illustrates the form of the switching signal applied to the attenuator 2 from the timing counter circuits 5 when the system is in synchronism and FIGURE 2(*c*) illustrates the form of the signal at the output of the attenuator 2 when the system is in synchronism with the received signal. From FIGURE 2(*c*), it will be seen that the signal applied to the coherent detector 7 is unattenuated during a period of 31.25 milliseconds symmetrically embracing the 15.625 millisecond period during which the received synchronizing tone occurs.

FIGURE 3(*a*) illustrates on a larger time scale the square-wave output from the phase reverser 6, the phase reversal point about which the synchronizing action takes place being at A. FIGURE 3(*b*) illustrates the received and part-attenuated signal applied to the coherent detector 7. This signal bears the time relationship to the waveform of FIGURE 3(*a*) corresponding to synchronism. FIGURE 3(*c*) shows the resultant output waveform of the coherent detector 7. Under conditions of synchronism, the coherent detector 7 provides first three negative-going pulses and then three positive-going pulses at its output during the 15.625 milliseconds period of the synchronizing tone, the output for the remainder of the time being incoherent since there is no simple frequency relationship between the character tones and the square-waveform of FIGURE 3(*a*). Thus at synchronism, no charge is built up on the capacitor in the resistance-capacity filter 8 over the one-second periods between successive operations of the relay 9. If, however, the phase reversal point A of the square waveform of FIGURE 3(*a*) occurs too early, say by one cycle of the synchronizing tone, then more positive-going pulses than negative-going pulses will appear at the output of the detector 7 and a positive charge will build up on the capacitor of the filter circuit 8 over a period of one second. When this capacitor is discharged by the relay 9, a negative-going pulse will be applied to the negative pulse amplifier 11 and the add/subtract gate 4 will cause a pulse to be prevented from reaching the input to the timing counter circuits 5, thereby causing the phase reversal point A to occur later. Similarly, if the phase reversal point A occurs too late, then more negative-going than positive-going pulses will appear at the detector 7 and a negative charge will build up on the capacitor in the filter circuit 8 over a period of one second. When the capacitor is discharged by the relay 9, a positive-going pulse will be applied to the positive pulse amplifier 10 and the add/subtract gate 4 will cause a pulse to be added to the input of the timing counter circuits 5, thereby causing the phase reversal point A to occur earlier. By this means synchronism is achieved.

FIGURE 3(*d*) illustrates the output from the timing circuits 5 which is applied to the attenuator 2. The effect of this is indicated in FIGURES 3(*b*) and 3(*c*). The operation of the attenuator 2 reduces the effect of the character tones on the charge on the capacitor in the filter 8. If the receiver system is badly out of synchronism, then the synchronizing tone will itself be attenuated by the attenuator 2. Clearly, the attenuation introduced by the attenuator 2 should not be so great as to prevent an approach towards synchronism under these conditions.

The attenuator 2 may be omitted altogether from the path of the signal applied to the coherent oscillator 1 and/or the coherent detector 7 if there is not enough signal available after attenuation to lock the oscillator 1 to the incoming synchronizing tone when the system is not synchronized. Alternatively, the attenuator 2 may be switched into the circuit when synchronism has been achieved. Under extremely noisy conditions the timing of the synchronizing system may hunt slightly about synchronism and it is for this reason that the attenuator is caused to pass signals unaltered for twice the duration of six cycles of the synchronizing tone.

FIGURE 4 is a circuit diagram of the coherent detector 7, the resistance-capacity filter 8 the pulse amplifiers 10 and 11 and the add/subtract gate 4. FIGURE 4 shows a coherent phase detector comprising four diodes D1, D2, D3 and D4. The output of the phase-reverser 6 (FIGURE 1) is applied to the diodes via an input 40 and a transformer T1. The output from the attenuator 2 is applied to the coherent detector through an input 41. Adjustment of the balance of the detector is made by means of a potentiometer VR1. The output from the coherent detector is applied to a filter circuit comprising resistors R1, R2 and R3 and capacitors C1 and C2, the charge representing the amount by which the system is out of synchronism being built up on the capacitor C2.

A contact 42 of the relay 9 (FIGURE 1) closes once every second (under the control of the timing counter circuits 5 of FIGURE 1) to discharge the capacitor C2 and the resulting pulse is applied via a capacitor C3 to the base of a transistor amplifier X1.

If the pulse resulting from the closure of the relay contact 42 is negative-going, (that is to say, the capacitor C2 was positively charged) the resulting positive-going pulse at the collector of the transistor X1 passes through a diode D5 to the base of a transistor amplifier X2. The resulting negative-going pulse at the collector of the transistor X2 is applied to a further transistor amplifier X3, the resultant positive-going output from the collector of the transistor X3 being applied to a monostable flip-flop circuit comprising transistors X4 and X5. This results in a positive going pulse lasting for 2.6 milliseconds at the collector of the transistor X4. This pulse is applied via a capacitor C4 and a resistor R4 to an add/subtract gate comprising a transistor X6 and two diodes D6 and D7 connected so that for the time that the positive-going pulse is applied, the transistor X6 is cut off. Negative-going pulses from the drive pulse generator 3 (FIGURE 1) are applied at a recurrence frequency of 384 pulses per second via an input 43 and a diode D8 to the base of the transistor X6 which normally passes these pulses unchanged. However when a positive pulse lasting one pulse recurrence period of 2.6 milliseconds occurs at the collector of the transistor X4, the transistor X6 is cut off for this time and one pulse is prevented from passing through the transistor X6. This occurs every time the relay contact 42 closes and a negative-going pulse occurs at the base of the transistor X1.

Each time a positive-going pulse occurs at the base of the transistor X1, the resulting negative-going pulse at the collector of this transistor is differentiated by a capacitor C5 and a resistor R5 and applied to the base of a transistor X7. The positive-going pulse produced at the collector of the transistor X7 is applied to the base of a transistor X8 and the resultant negative-going pulse is applied through a capacitor C6 and a diode D9 to the base of the transistor X6. The delays in the circuit are so arranged that the negative-going pulses applied in this manner to the base of the transistor X6 always occur in between the pulses applied to it from the terminal 43. It follows that each time the relay contact 42 is closed and a positive pulse occurs at the base of the transistor X1, an extra pulse occurs in the pulse train issuing from the collector of the transistor X6. This pulse train is applied to the timing counter circuits 4 of FIGURE 1.

Although the embodiment of the present invention hereinbefore described relates to a single-channel teleprinter system, it will be clear to those versed in the art that the synchronising system of the present invention may be applied to other systems. For example, the synchronising system may be employed in a time-division multiplex system in which synchronising tones of different frequency from the information signals are inserted at suitable intervals in the signal transmitted and received.

We claim:

1. A receiver synchronising system for a receiver arranged to receive a signal train having a predetermined whole number of cycles of a synchronising tone inserted at regular intervals corresponding to an even whole number ($2n$) of cycles of the synchronising tone and including a coherent oscillator connected to receive the signal train and tuned for synchronisation with the said synchronising tone, phase reverser means for reversing the phase of signals derived from the coherent oscillator once every $n$ cycles of oscillation of the coherent oscillator, a coherent detector, connected to the output of the phase reverser means and connected to receive the said synchronising tone, for detecting the relative phases of the output of the phase reverser means and the received synchronising tone, receiver timing circuits and means connected to the output of the coherent detector for controlling the said receiver timing circuits.

2. A receiver synchronising system as claimed in claim 1 and wherein the receiver timing circuits include timing counter circuits connected to the output of the said coherent oscillator for counting the number of cycles of the said coherent oscillator.

3. A receiver synchronising system as claimed in claim 2 and wherein an output of the timing counter circuits is connected to the phase reverser means to control the timing of the phase reversals of the said signals derived from the coherent oscillator.

4. A receiver synchronising system as claimed in claim 2 and wherein the said means for controlling the receiver timing circuits includes means for preventing a cycle of the output of the coherent oscillator from being counted by the timing counter circuits if the output of the said coherent detector deviates from a datum output in one sense and for generating an additional count signal at the input of the timing counter circuits if the output of the coherent detector deviates from the said datum output in the opposite sense.

5. A receiver synchronising system as claimed in claim 2 and wherein the said means for controlling the receiver timing circuits includes means for sampling the output of the coherent detector at intervals long compared with the said regular intervals corresponding to an even whole number of cycles of the synchronising tone and means for preventing a cycle of the output of the coherent oscillator from being counted by the timing counter circuits if the sampled output of the coherent detector deviates from a datum output in one sense and for generating an additional count signal at the input of the timing counter circuits if the sampled output of the coherent detector deviates from the said datum output in the opposite sense.

6. A receiver synchronising system as claimed in claim 1 and wherein an attenuator is connected into received signal inputs to the coherent oscillator and the coherent detector and is also connected to the receiver timing circuits so as to cause attenuation of the signal train during periods controlled by the said timing circuits.

7. A synchronising system for a receiver arranged to receive a signal train having a predetermined number of cycles of a synchronising tone inserted therein at regular intervals corresponding to a whole number of cycles of a synchronising tone; a coherent oscillator connected to receive said signal train and having the same frequency as the synchronising tone, receiver timing circuits connected to said coherent oscillator, phase reverser means connected to said coherent oscillator and to said receiver timing circuits for reversing the phase of signals derived from the coherent oscillator each time said receiver timing circuits register half of the said whole number of cycles generated by said coherent oscillator, a coherent detector connected to the output of said phase reverser means and connected to receive said synchronising tone for detecting the relative phases of the output of the phase reverser means and the received synchronising tone, and means connected to the output of the said coherent detector and to the said receiver timing circuits for adjusting the number of cycles registered thereby.

8. A synchronising system as claimed in claim 7 and wherein the means for adjusting the number of cycles registered includes means for preventing a cycle of the output of the coherent oscillator from being counted by the receiver timing circuits if the output of the coherent detector deviates from a datum in one sense and means for generating an additional count signal at the input of the receiver timing circuits if the output of the coherent detector deviates from the said datum in the opposite sense.

9. A synchronising system as claimed in claim 7 and wherein the means for adjusting the number of cycles registered includes means for sampling the output of the coherent detector at intervals long compared with the said regular intervals corresponding to a whole number of cycles of the synchronising tone and means for preventing a cycle of the output of the coherent oscillator from being counted by the receiver timing circuits if the sampled output of the coherent detector deviates from a datum in one sense and means for generating an additional count signal at the input of the receiver timing circuits if the sampled output of the coherent detector deviates from the said datum in the opposite sense.

10. A synchronising system as claimed in claim 7 and wherein an attenuator is connected into received signal inputs to the coherent oscillator and the coherent detector and is also connected to the receiver timing circuits so as to cause attenuation of the signal train during periods controlled by the said timing circuits.

References Cited in the file of this patent

UNITED STATES PATENTS

| | | |
|---|---|---|
| 2,342,693 | Ressler | Feb. 29, 1944 |
| 2,359,649 | Kahn et al. | Oct. 3, 1944 |
| 2,490,039 | Earp | Dec. 6, 1949 |
| 2,934,604 | Bizet | Apr. 26, 1960 |

FOREIGN PATENTS

| | | |
|---|---|---|
| 1,244,757 | France | Jan. 19, 1960 |